United States Patent Office 3,458,692
Patented July 29, 1969

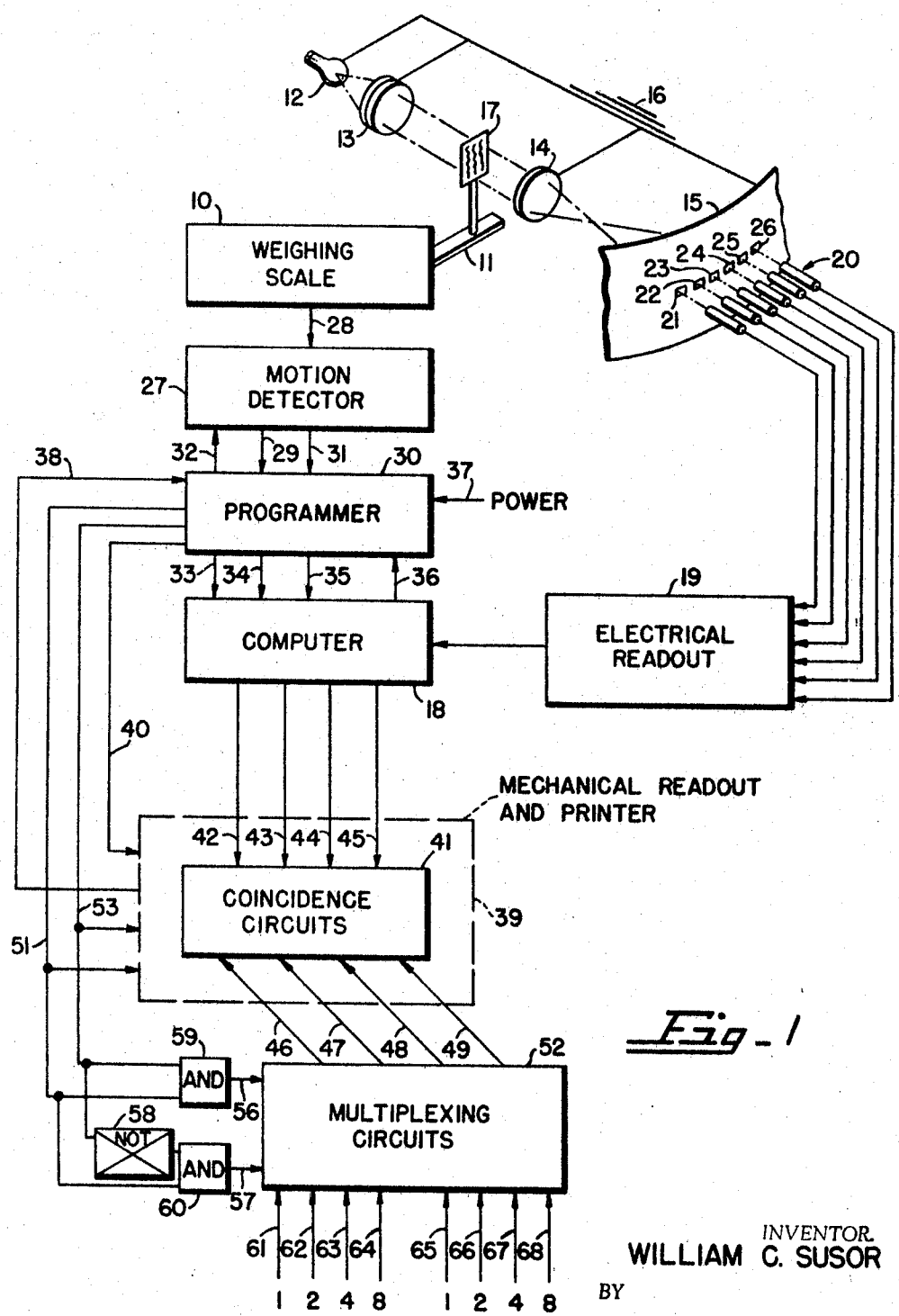

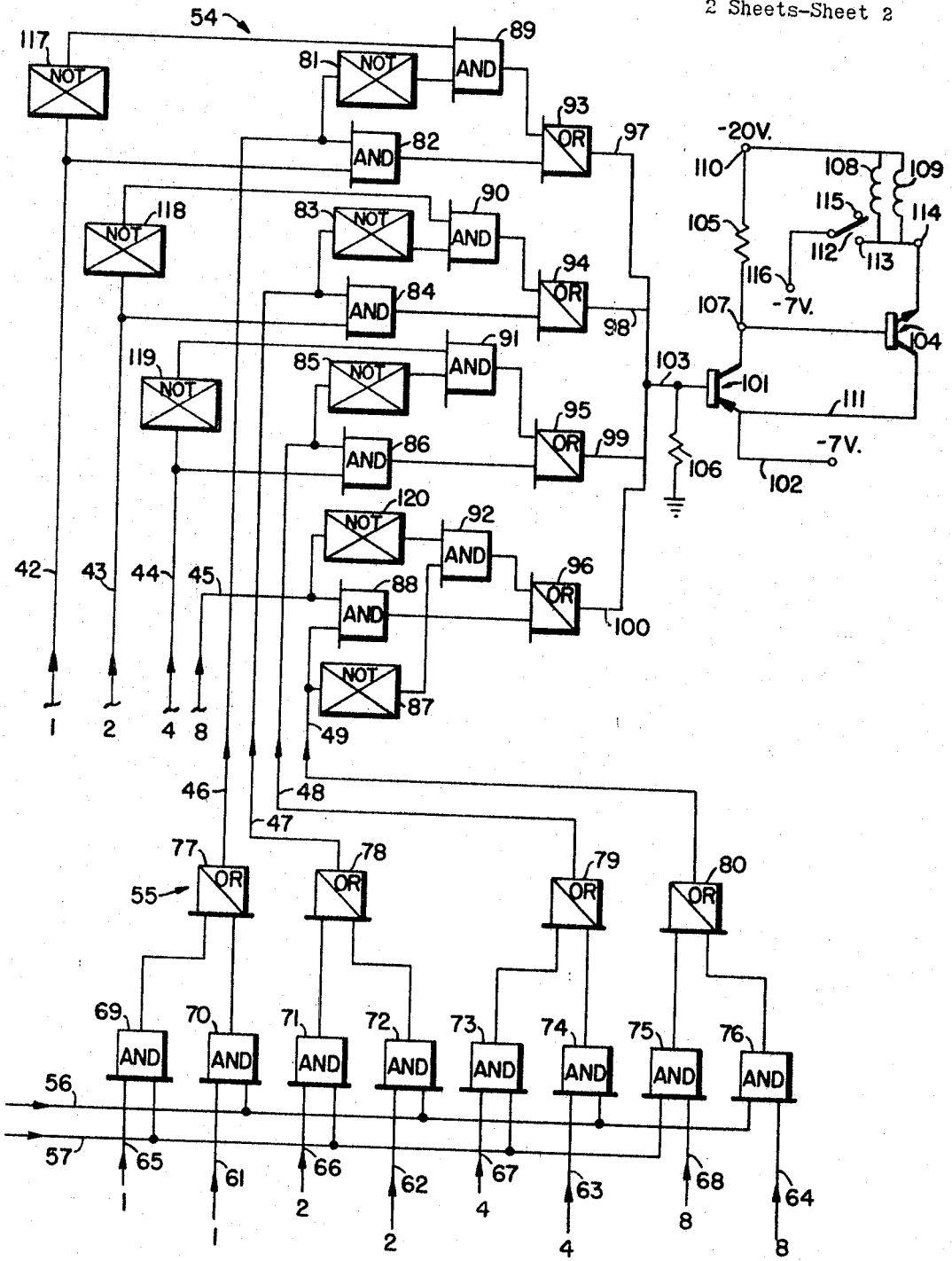
Fig_2

3,458,692
COMPUTING AND PRINTING WEIGHING SCALE WITH MULTIPLEXING CIRCUITRY FOR DOUBLE USE OF SYSTEM COMPONENTS
William C. Susor, Oregon, Ohio, assignor to Toledo Scale Corporation, Toledo, Ohio, a corporation of Ohio
Filed Apr. 7, 1965, Ser. No. 446,274
Int. Cl. G06f *15/20;* G06g *7/48;* G01g *23/38*
U.S. Cl. 235—151.33                                6 Claims

ABSTRACT OF THE DISCLOSURE

An electrical computing and printing weighing scale having a register and coincidence circuitry for detecting coincidence between information in the register and the mechanical positions of printing members to set up the printing members in accordance with the information in the register. Multiplexing circuitry permits the use of the same register both for storing unit price and computed value information during different parts of the cycle and also permits the double use of some of the parts of the coincidence circuitry during different portions of the cycle.

---

This invention relates to multiplexing circuitry.

The multiplexing circuitry is particularly suitable for use in the system for weighing, computing and printing a record of the weight and value of each of a plurality of successively weighed loads which is disclosed in U.S. application Ser. No. 439,751 filed Mar. 15, 1965 in the name of William C. Susor. In such system, selected unit prices are multiplied by one and the amounts (prices) are used to set up price-printing members and such selected unit prices also are multiplied by the weights of the loads and the computed values are used to set up value-printing members.

The objects of this invention are to improve systems for weighing, computing and printing a record of the weight and value of each of a plurality of successively weighed loads and to simplify such systems by providing multiplexing circuitry by means of which several of the system components are used twice during every weighing, computing and printing cycle, once for setting up unit price-printing members and once for setting up value-printing members.

One embodiment of this invention enabling the realization of these objects is multiplexing circuitry in circuit with the coincidence circuits disclosed in the above U.S. application Ser. No. 439,751. The coincidence circuits receive 1–2–4–8 binary coded unit price signals from a register and the multiplexing circuitry receives 1–2–4–8 binary coded signals indicative of the positions of the unit price commutators in the mechanical readout disclosed in such U.S. application Ser. No. 439,751, when a selected unit price is multiplied by one and the amount (price) is to be set up on price-printing members. The coincidence circuits also receive 1–2–4–8 binary coded computed value signals from the register and the multiplexing circuitry also receives 1–2–4–8 binary coded signals indicative of the positions of the computed value commutators in such mechanical readout, when such selected unit price is multiplied by weight and the computed value is to be set up on computed value-printing members.

The mechanical readout includes a combination of modules each comprising a detent wheel which is directly gear-connected to a commutator and to a print wheel. Each module indicates the digits of a particular denominational order, there being a series of modules indicating the selected price and another series of modules indicating the computed value. The modules indicating the digits of the same denominational orders in the unit price and computed value have common coincidence circuits and are set up in accordance with the count in a register which is used both for accumulating partial unit price products and partial computed value products.

In accordance with the above, one feature of this invention resides in the simplification of the system by using one register for both functions and by using one coincidence circuit for two readout modules (one unit price and one computed value module). That is, the multiplexing circuit permits the register and each coincidence circuit to be used twice during every weighing, computing and printing cycle.

Another feature resides in the superior simplicity of the coincidence and multiplexing circuits.

The above and other objects and features of this invention will be appreciated more fully from the following detailed description when read with reference to the accompanying drawings wherein:

FIG. 1 is a schematic diagram illustrating the general organization of the weighing, computing and printing system with the multiplexing circuitry of the invention combined therewith; and FIG. 2 is a block diagram of one of the coincidence circuits and of one of the multiplexing circuits shown in FIG. 1.

Referring to FIG. 1, a computing weighing scale 10 includes a lever 11 and an optical projection system which diagrammatically includes a light source 12, a condensing lens 13, a projection lens 14 and a photocell mask 15. The light source 12, the lenses 13 and 14, and the mask 15 are connected to ground as shown at 16 (e.g., base of weighing scale), the mask 15 being rigidly mounted with respect to the projection optics. A coded chart 17 is moved by the load-responsive lever 11 in the optical projection system, the chart 17, hence, being condition responsive. The computer 18 receives weight information from the scale and multiplies the weight of an article upon the scale by the unit price of such article to compute the value of such article. The computer 18 also multiplies such unit price times one so that it can produce a unit price output. The computer 18 has a weight input which is compatible with the parallel 1–2–4–8 binary coded decimal output of an electrical readout 19 in circuit therewith. The complete description of an analog to digital converter is not necessary to a full understanding of this invention. The above combination of weighing scale, optical projection system, electrical readout and computer is shown in the above U.S. application Ser. No. 439,751.

The chart 17 has a matrix of coded markings arranged in vertical bands so that the relative position thereof may be read by a bank of readout photocells 20, with one cell being associated with each column, providing an indication of the weight upon the scale. The output of the photocells is applied to the electrical readout 19, which makes available weight information to the input of the computer 18. The mask 15 is shown as being slitted at 21–26 so that a small and clearly defined portion of the projected image of the chart 17 is permitted to fall on each of the sensitive grids of the photocells, i.e., the mask screens out unwanted chart bits (the projection lens 14 projects all of the bits in its field of view). There is a total of fourteen photocells in the photocell bank 20, only six of the fourteen photocells being shown for the sake of simplicity. Fourteen photocells are enough to read out a chart capacity of 25.00 pounds.

The weighing scale 10 is connected operatively to a motion detector 27 through a connection 28 as also shown in the above U.S. application Ser. No. 439,751 the motion detector preventing erroneous weight readouts from taking place when the weighing mechanism is in motion as described in the application. The motion detector 27 applies no motion signals through a lead 29 to a programmer 30 as also shown in the above U.S. application Ser. No. 439,751. The motion detector 27 also applies motion signals through a lead 31 to the programmer 30 and receives conditioning signals from the programmer 30 through a lead 32.

The programmer 30 applies reset signals and command to compute signals through leads 33, 34 and 35, respectively, to the computer 18 and receives program advance signals through a lead 36 from the computer 18. The programmer 30 also receives power on signals through a lead 37 and coincidence check signals through a lead 38. The coincidence check signals indicate that the computer 18 and the readout positions of the number wheels in a mechanical readout and printer 39 agree. Similar coincidence check signals are described in the above U.S. application Ser. No. 439,751. The programmer 30 also applies a signal through a lead 40 to the mechanical readout and printer 39 commanding it to print.

As described in the above U.S. application Ser. No. 439,751, the programmer 30 is used in conjunction with a mechanical readout which is disclosed in U.S. application No. 416,526, filed Dec. 7, 1964, in the name of C. E. Adler. The readout includes a combination of modules each comprising a detent wheel which is directly gear-connected to a commutator and to a print wheel. Each module indicates the digits of a particular denominational order. When the turning print wheel approaches the correct indicating position, a stopping latch pawl intercepts the correct one of the teeth of the detent wheel to arrest the detent wheel. Such readout also includes coincidence circuits 41 which receive 1–2–4–8 binary coded unit price signals from the computer 18 through leads 42–45 and 1–2–4–8 binary coded decimal signals from multiplexing circuits 52 in accordance with the invention through leads 46–49 indicative of the positions of the corresponding commutators. The detent wheels and thus the print wheels are stopped when the coincidence circuits determine that the wheels are in the correct indicating positions. The readout also includes a solenoid which when it receives a signal through a lead 51 permits a new reading to be made and a solenoid which when it receives a signal through a lead 53 unlocks the unit price indicating modules. Similarly, the coincidence circuits 41 receive 1–2–4–8 binary coded decimal computed value signals from the computer 18 through the same leads 42–45 and 1–2–4–8 binary coded decimal signals from the multiplexing circuits 52 through the same leads 46–49 indicative of the positions of the corresponding commutators.

Although the various logic circuits mentioned herein are in common use in the electronic control field, a brief description of the function of each circuit is as follows. An AND logic circuit produces an output signal when, and only when, all of a plurality of input signals are present. A NOT logic circuit produces an output signal at all times unless an input signal is present. An OR logic circuit produces an output upon receiving an input signal at any of a plurality of input terminals. For further details on the construction and operation of various types of logic circuits reference is made to an article entitled "Static Switching Devices," by Robert A. Mathias, in Control Engineering, May 1957. All of the logic circuits mentioned hereinafter are of conventional type. The connections between said circuits are clearly shown in the drawings and will not be described in detail.

Each of the mechanical readout modules indicates the digits of a particular denominational order, there being a series of modules indicating the selected unit price and another indicating the computed value. The modules indicating the digits of the same denominational orders in the unit price and computed value have common coincidence circuits, for example, a coincidence circuit 54 shown in FIG. 2, and are set up in accordance with the count in a register which is used both for accumulating partial unit price products and partial computed value products as shown and described in detail in the above U.S. application Ser. No. 439,751. The register includes a series of counter stages that accumulate the partial products. Each counter puts 1–2–4–8 binary coded decimal outputs on its four output leads, one set of which is numbered 42–45 in FIGS. 1 and 2. There are two commutators and two print wheels for each set of four counter output leads in the cases where the unit price and computed values have common denominational orders (computer capacity is $9.99 for unit price and $99.99 for computed value). Accordingly, during each weighing, computing and printing cycle, a 1–2–4–8 binary coded decimal unit price signal is put on the leads 42–45 after the selected price has been multiplied by one as an input to the coincidence circuit 54 and then a 1–2–4–8 binary coded decimal computed value signal is put on the same leads 42–45 after the selected price has been multiplied by the weight entry as an input to the coincidence circuit 54.

When the 1–2–4–8 binary coded decimal unit price signal is put on the leads 42–45 as an input to the coincidence circuit 54, a 1–2–4–8 binary coded decimal signal from a multiplexing circuit 55 (FIG. 2) is put on the leads 46–49 as programmed by signals on leads 56 and 57 (FIGS. 1 and 2) in circuit with the programmer 30 and with the multiplexing circuit 55. As hereinafter described, this sets up the respective mechanical readout module for unit price printing. Similarly, when the 1–2–4–8 binary coded decimal computed value signal is put on the leads 42–45 as an input to the coincidence circuit 54, a 1–2–4–8 binary coded decimal signal from the multiplexing circuit 55 is put on the leads 46–49 as programmed by signals on the leads 56 and 57. As hereinafter described, this sets up the respective mechanical readout module for computed value printing.

The leads 51 and 53 in addition to being connected to the mechanical readout and printer 39 as indicated above also are connected to the leads 56 and 57 through NOT gate 58, AND gate 59 and AND gate 60 (FIG. 1). As mentioned in the above U.S. application Ser. No. 439,751, the programmer 30 is disclosed in detail in U.S. application Ser. No. 429,230 filed Feb. 1, 1965 in the names of W. C. Susor and O. J. Martin. Leads 51 and 53 in FIG. 1 correspond to leads 51 and 53 shown in FIGS. 1 and 2 in U.S. application Ser. No. 429,230. As described in such application, after output signals are applied to both leads 51 and 53, the print wheels in the mechanical readout and printer are set up in accordance with the unit price of the commodity to be weighed. The leads 51 and 53 at this point in the cycle apply such signals to the AND gate 59 enabling it and the enabled AND gate 59 applies its output to the lead 56; the leads 51 and 53 at this point in the cycle also apply such signals to the AND gate 60 and to the NOT gate 58, respectively. Since the NOT gate 58 has an input it does not apply an output to the AND gate 60 and the AND gate 60 is not enabled. Hence, for unit price printing, the lead 56 applies an input to the multiplexing circuits 52 and the lead 57 does not apply an input to the multiplexing circuits 52. As also described in the above U.S. application Ser. No. 429,230, after unit price readout has been accomplished, computed value readout is programmed by putting an output signal on lead 51 and by putting at the same time no output signal on lead 53. The lead 51 at this point in the cycle applies its signal to the AND gates 59 and 60 partially enabling both gates. Gate 59 is not completely enabled because there is no output signal on lead 53. However, partially enabled gate 60 is completely enabled by an output from the NOT gate 58 which has an output because lead 53 is not applying an input signal to the NOT gate 58. Accordingly, for computed value readout, the AND gate 59 has no output and the lead 56 in circuit with the AND gate 59 applies no input to the multiplexing circuits 52 and the AND gate 60 has an output and the lead 57 in circuit with the AND gate 60 applies an input to the multiplexing circuits 52.

The mechanical readout and printer 39, as mentioned above, is disclosed in detail in U.S. application Ser. No. 416,526 which describes how 1–2–4–8 binary coded decimal signals indicative of the positions of corresponding commutators are produced. These signals are shown in such application as being applied directly to the coincidence circuits; however, these signals are applied to the multiplexing circuits 52 in accordance with the invention which in turn apply 1–2–4–8 binary coded decimal signals to the coincidence circuits 41. 1–2–4–8 binary coded decimal signals indicative of the position of one of the unit price commutators and thus indicative of the position of the corresponding unit price printing wheel are applied through leads 61–64 to the multiplexing circuit 55 (FIG. 2) and 1–2–4–8 binary coded decimal signals indicative of the position of one of the computed value commutators and thus indicative of the position of the corresponding computed value printing wheel are applied through leads 65–68 to the multiplexing circuit, such unit price printing wheel and computed value printing wheel indicating the digits of the same denominational order in the unit price and computed value.

The multiplexing circuit 55 (FIG. 2) includes eight AND gates 69–76 and four OR gates 77–80. For unit price printing, as described above, lead 56 applies an input to the multiplexing circuit 55. This partially enables AND gates 70, 72, 74 and 76. For computing value printing, as described above, lead 57 applies an input to the multiplexing circuit 55. This partially enables AND gates 69, 71, 73 and 75. The partially enabled AND gates 70, 72, 74 and 76 are completely enabled by the 1–2–4–8 binary coded decimal signals indicative of the positions of the unit price printing wheel applied through the leads 61–64 to the AND gates 70, 72, 74 and 76, respectively. The partially enabled AND gates 69, 71, 73 and 75 are completely enabled by the 1–2–4–8 binary coded decimal signals indicative of the position of the computed value printing wheel applied through the leads 65–68 to the AND gates 69, 71, 73 and 75, respectively. The enabled AND gates 70, 72, 74 and 76 enable the OR gates 77–80. The enabled AND gates 69, 71, 73 and 75 also enable the OR gates 77–80. The enabled OR gates 77–80 put 1–2–4–8 binary coded decimal output signals on the leads 46–49 connected to the coincidence circuit 54.

The coincidence circuit 54 (FIG. 2) includes a NOT gate 81 and an AND gate 82 both having an input connected through the lead 46 to the output of the OR gate 77; a NOT gate 83 and an AND gate 84 both having an input connected through the lead 47 to the output of the OR gate 78; a NOT gate 85 and an AND gate 86 both having an input connected through the lead 48 to the output of the OR gate 79; and a NOT gate 87 and an AND gate 88 both having an input connected through the lead 49 to the output of the OR gate 80. The outputs of NOT gates 81, 83, 85 and 87 are applied as inputs to AND gates 89–92, respectively, and the outputs of such AND gates 89–92 are applied as input to OR gates 93–96, respectively. The outputs of the OR gates 93–96 are connected to leads 97–100, respectively, and these leads 97–100 correspond to leads 166–169 shown in FIG. 2 in the above U.S. application Ser. No. 416,526. As described in such application, if there is current flow in lead 97 or 98 or 99 or 100 (not at coincidence), then there is current flow in a PNP transistor 101 which has its emitter connected to a minus 7 volts power supply through a lead 102, its base connected to the leads 97–100 through a lead 103, and its collector connected to the base of an NPN transistor 104 and to a resistor 105. A resistor 106 is connected between the lead 103 and ground. When the PNP transistor 101 is on, terminal 107 connected to the collector of the transistor 101 comes to minus 7 volts, the same as that of the power supply on the lead 102. The resistor 105 and latch coils 108 and 109 are connected to a minus 20 volts power supply connected to a terminal 110, the latch coils 108 and 109 also being connected to the emitter of the NPN transistor 104, and the collector of the NPN transistor 104 is connected through a lead 111 to the emitter of the PNP transistor 101. A contact 112 when closed engages a terminal 113, connected to a terminal 114 between the latch coils 108 and 109 and the emitter of the transistor 104, and when open engages a dead terminal 115, the contact 112 being connected to a minus 7 volts power supply on a terminal 116. When the PNP transistor 101 is on, the NPN transistor 104 also is on because the base of the transistor 104 (connected to minus 7 volts terminal 107) is more positive than the emitter of the transistor 104 (connected to minus 20 volts terminal 110) and current flows through the latch coils 108 and 109. The latch coils 108 and 109 are solenoid coils and thus their solenoids are energized when coincidence does not exist and are de-energized when coincidence exists (no current flow in any of the output leads 97–100—transistors 101 and 104 off—no current flow in latch coils 108 and 109).

As described in the above U.S. application Ser. No. 416,526, the mechanical readout 39 includes a plurality of modules each comprising a detent wheel which is directly gear-connected to a commutator and to a print wheel. Each module indicates the digits of a particular denominational order, there being a series of modules indicating unit price and another indicating the computed value. The modules indicating the digits of the same denominational orders in the unit price and computed value in accordance with the invention have common coincidence circuits, for example, the coincidence circuit 54. When the turning print wheels, as described in the above U.S. application Ser. No. 416,526, approach the correct indicating positions, stopping latch pawls intercept the correct ones of the teeth of the detent wheels to arrest the detent wheels. Each of the stopping latch pawls is moved in the wheel stopping direction by a spring and in the opposite direction in opposition to the spring by means of a solenoid. Energization of the solenoids keep the stopping latches from the teeth of the detent wheels. Latch coil 108 (FIG. 2) is a coil which operates one of such solenoids and is part of a unit price module. Latch coil 109 (FIG. 2) is a coil which operates another one of such solenoids and is part of a computed value module. The modules of which coils 108 and 109 are a part indicate the digits of the same denominational order in the print price and computed value.

The coincidence circuit 54 also includes four NOT gates 117–120 having their inputs connected to the leads 42–45, respectively, and their outputs connected to the inputs of the AND gates 89–92, respectively. The leads 42–45 also are connected to the inputs of the AND gates 82, 84, 86 and 88, respectively. The coincidence circuit 54 looks for coincidence between the 1–2–4–8 binary coded decimal inputs on leads 42–45, respectively, and the 1–2–4–8 binary coded decimal inputs on leads 46–49, respectively. For example, if leads 42 and 46 each carry a not 1 (1) input, NOT gates 117 and 81 having their inputs connected to such respective leads each produce an output because they do not have an input. The two outputs from the two NOT gates 117 and 81 enable the AND gate 89 and its output is applied as an input to the OR gate 93. When the OR gate 93 is enabled, no current flows in its output lead 97. As described above, if there is no current flow in lead 97 or 98 or 99 or 100 (coincidence), then there is no current flow in the transistor 101 and 104 and there is no current flow in the latch coils 108 and 109. At the same time, since leads 42 and 46 each carry not 1 (1) inputs, the AND gate 82 connected at its input to such leads is not enabled. If leads 42 and 46 each carry a true 1 (1) input, NOT gates 117, 81 having their inputs connected to such respective leads each produce no output and, hence, the AND gate 89 is not enabled. However, leads 42 and 46 carry the true 1 (1) inputs to the AND gate 82 enabling it which in turn enables the OR gate 93 and again there is no current flow in output lead 97. If lead 42 carries a true 1 (1) input and lead 46 carries a not 1

(1) input, NOT gate 117 has no output and NOT gate 81 has an output as described above only partially enabling AND gate 89, and AND gate 82 connected to such leads also is only partially enabled. Since both AND gates 89 and 82 are only partially enabled, OR gate 93 is not enabled and current flows in output lead 97 (current flow toward OR gate 93). Current flows or does not flow in output leads 98–100 similarly in response to detection of no coincidence or coincidence between the respective 2 and 4 and 8 binary coded decimal signals. Accordingly, current flow in lead 97 or 98 or 99 or 100 indicates no coincidence and no current flow in lead 97 or 98 or 99 or 100 indicates coincidence.

In operation, as described above, during each weighing, computing and printing cycle, a 1–2–4–8 binary coded decimal unit price signal is put on the leads 42–45 after the unit price has been multiplied by one as an input to the coincidence circuit 54 and a 1–2–4–8 binary coded decimal unit price signal from the multiplexing circuit 55 is put on the leads 46–49 as programmed by signals on leads 56 and 57 in circuit with the programmer 30 and with the multiplexing circuit 55. At the same time, input signals on leads 51 and 53 (FIG. 1) unlock the unit price readout wheels and initiate a readout cycle. The latch coils 108 and 109 are energized immediately after the initiation of a readout cycle by the closing of contacts 112 momentarily (the energized solenoids hold the stopping latch pawls out of engagement with the detent wheel teeth). Closing of such contacts 112 connects the minus 7 volts power supply at the terminal 116 to the latch coils 108 and 109 which are kept energized after the contacts 112 open by current flow through the transistors 101 and 104 due to no coincidence at the beginning of the readout cycle. The readout wheels corresponding to latch coils 108 and 109 are rotated until the coincidence circuit 54 detects coincidence between the unit price readout wheel corresponding to latch coil 108 and the unit price count in the counter connected to leads 42–45. Such coincidence causes no current flow in lead 97 or 98 or 99 or 100 and thus no current flow in latch coils 108 and 109 and the stopping latch pawls corresponding to latch coils 108 and 109 are spring-driven to stop the respective unit price readout wheel in its correct indicating position and the respective computed value readout wheel in a random position. The unit price readout wheel corresponding to latch coil 108 and also the other two unit price readout wheels (unit price input capacity is $9.99) are locked in place in their readout positions ready for the printing operation.

Also during each weighing, computing and printing cycle after the unit price readout wheels are locked in place ready for printing and after the unit price has been multiplied by the weight entry, a 1–2–4–8 binary coded decimal computed value signal is put on the leads 42–45 as an input to the coincidence circuit 54 and a 1–2–4–8 binary coded decimal computed value signal from the multiplexing circuit 55 is put on the leads 46–49 as programmed by the programmer signals on the leads 56 and 57. At the same time an input signal on the lead 51 (no signal on the lead 53 at this time) initiates another readout cycle (contacts 112 close momentarily—computed value readout wheels rotate but unit price readout wheels remain locked in readout position). The readout computed value readout wheel corresponding to the latch coil 109 is rotated until the coincidence circuit 54 detects coincidence between the computed value readout wheel corresponding to the latch coil 109 and the computed value count in the counter connected to leads 42–45. Such coincidence causes no current flow in lead 97 or 98 or 99 or 100 and thus no current flow in latch coils 108 and 109. The stopping latch pawl corresponding to latch coil 109 is spring-driven to arrest the respective computed value readout wheel in its correct indicating position.

It is to be understood that the above description is illustrative of this invention and that various modifications thereof can be utilized without departing from its spirit and scope.

Having described the invention, I claim:

1. In a system having a cycle of operations for weighing, computing and printing a record of each of a plurality of successively weighed loads, in combination, weighing mechanism, computer means for computing the value of each weighed load according to a selected price and for multiplying the selected price times one to compute price, means for making weight information provided by the weighing mechanism available to the computer means, readout means electrically connected to the computer means including printer means for printing a record of the computed price and computed value and coincidence circuit means for detecting coincidence between the computed price and computed value information in the computer means and the printer means, at least one of the orders the digits of which are printed by the printer means in the computed price and computed value being the same, the coincidence circuit means including one coincidence circuit having two latch means for controlling those parts of the printer means printing the digits in said same computed price and computed value orders, programmer means for programming the system, and multiplexing circuit means for applying first and second signals spaced in time to said coincidence circuit, as programmed by the programmer means, indicative of the respective positions of said parts of the printer means, whereby the coincidence circuit is used twice during every cycle, once for setting up said part of the printer means printing the digits in said same computed price order and once for setting up said part of the printer means printing the digits in said same computed value order.

2. In a system in accordance with claim 1 wherein the coincidence circuit includes four NOT gates having their inputs connected to the computer means, four additional NOT gates having their inputs connected to the multiplexing circuit means, four AND gates having their inputs connected to the computer means and to the multiplexing circuit means, four additional AND gates having their inputs connected to the outputs of said eight NOT gates, and four OR gates having their inputs connected to the outputs of said eight AND gates, the outputs of the OR gates being in circuit with said two latch means for controlling said two latch means in accordance with detection of said coincidence between information in the computer means and the printer means.

3. In a system in accordance with claim 1 wherein the multiplexing circuit means includes eight AND gates having their inputs connected to the readout means and in circuit with the programmer means and four OR gates having their inputs connected to the outputs of said multiplexing circuit AND gates, the multiplexing circuit OR gates applying said input signals to said coincidence circuit.

4. In a system having a cycle of operations for weighing, computing and printing a record of each of a plurality of successively weighed loads, in combination, weighing mechanism, computer means for computing the value of each weighed load according to a selected price, means for making weight information provided by the weighing mechanism available to the computer means, readout means electrically connected to the computer means including printer means for printing a record of the selected price and computed value, respectively, the printer means including means, comprising a first latch coil, for printing the digits of an order in the selected price and also including means, comprising a second latch coil, for printing the digits of an order in the computed value, said orders being the same, programmer means for programming said cycle of operations of the system, and a multiplexing circuit for the two latch coils which applies a first signal, as programmed by the programmer means, to the readout means indicative of the position of said printing means comprising the first latch coil and a second signal, as programmed by the programmer means, to the readout means indicative of the position of said printing means comprising the second latch coil.

5. In a system having a cycle of operations for weighing, computing and printing a record of each of a plurality of successively weighed loads, in combination, weighing mechanism, computer means for computing the value of each weighed load according to a selected price, means for making weight information provided by the weighing mechanism available to the computer means, readout means electrically connected to the computer means including printer means for printing a record of the selected price and computed value and coincidence circuit means for detecting coincidence between information in the computer means and the printer means to set up the printer means in accordance with the information in the computer means, at least one of the orders the digits of which are printed by the printer means in the selected price and computed value being the same, the coincidence circuit means including one coincidence circuit having two latch means for controlling those parts of the printer means printing the digits of said same seleted price and computed value orders, and programmer means for programming said cycle of operations of the system.

6. In a system having a cycle of operations for weighing, computing and printing a record of each of a plurality of successively weighed loads, in combination, weighing mechanism, computer means for computing the value of each weighed load according to a selected price, means for making weight information provided by the weighing mechanism available to the computer means, readout means electrically connected to the computer means including printer means for printing a record of the selected price and computed value and coincidence circuit means for detecting coincidence between information in the computer means and the printer means, at least one of the orders in the selected price and computed value being the same, multiplexing circuit means applying signals to the coincidence circuit means indicative of the positions of the printer means, the coincidence circuit means including only one coincidence circuit and the multiplexing circuit means including only one multiplexing circuit serving those parts of the printer means which print the digits of said same orders in the selected price and computed value, and programmer means for programming said cycle of operations of the system.

References Cited

UNITED STATES PATENTS

| 3,393,302 | 7/1968 | Cichanowicz et al. | 235—61 |
| 1,957,193 | 5/1934 | Armbruster | 101—90 XR |
| 3,104,806 | 9/1963 | Allen. | |

MARTIN P. HARTMAN, Primary Examiner

U.S. Cl. X.R.

177—25; 235—61